United States Patent
Lai et al.

(10) Patent No.: US 8,976,519 B2
(45) Date of Patent: Mar. 10, 2015

(54) PORTABLE COMPUTER

(71) Applicant: Wistron Corporation, New Taipei (TW)

(72) Inventors: Yen-Chang Lai, New Taipei (TW);
Shang-Mao Lee, New Taipei (TW);
Chun-Chien Chen, New Taipei (TW);
Hung-Chih Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 149 days.

(21) Appl. No.: 13/917,052

(22) Filed: Jun. 13, 2013

(65) Prior Publication Data

US 2014/0043747 A1 Feb. 13, 2014

(30) Foreign Application Priority Data

Aug. 10, 2012 (TW) .............................. 101129033 A

(51) Int. Cl.
*G06F 1/16* (2006.01)

(52) U.S. Cl.
CPC ............ *G06F 1/1607* (2013.01); *G06F 1/1616* (2013.01); *G06F 1/1679* (2013.01); *Y10S 248/917* (2013.01); *Y10S 248/922* (2013.01)
USPC .............. 361/679.26; 361/679.27; 312/223.1; 312/223.2; 248/917; 248/922

(58) Field of Classification Search
CPC .............................. G06F 1/162; Y10S 248/921
USPC .................................................... 361/679.26
See application file for complete search history.

(56) References Cited

U.S. PATENT DOCUMENTS

| 5,085,394 | A * | 2/1992 | Torii .............................. 248/455 |
| 6,778,196 | B2 * | 8/2004 | Nakamura ............... 361/679.27 |
| 6,903,927 | B2 * | 6/2005 | Anlauff .................... 361/679.28 |
| 7,184,263 | B1 | 2/2007 | Maskatia |
| 7,239,505 | B2 * | 7/2007 | Keely et al. .............. 361/679.09 |
| 8,467,184 | B2 * | 6/2013 | Chen et al. ................ 361/679.55 |
| 2006/0038795 | A1 * | 2/2006 | Lee ................................ 345/173 |
| 2006/0077622 | A1 * | 4/2006 | Keely et al. ................... 361/681 |
| 2007/0030634 | A1 * | 2/2007 | Maskatia ....................... 361/683 |
| 2007/0152113 | A1 * | 7/2007 | Okuley et al. ................. 248/133 |
| 2008/0024975 | A1 * | 1/2008 | Huang et al. .................. 361/686 |
| 2013/0077212 | A1 * | 3/2013 | Nakajima ................ 361/679.01 |

FOREIGN PATENT DOCUMENTS

| TW | 566583 | 12/2003 |
| TW | 584227 | 11/2004 |

* cited by examiner

*Primary Examiner* — Anthony Q Edwards
(74) *Attorney, Agent, or Firm* — Muncy, Geissler, Olds & Lowe, P.C.

(57) ABSTRACT

A portable computer includes a base, a display module, a support element and a sliding assembly. The base defines a first area and a second area between a front end and a rear end thereof, The display module includes a connecting end having a connecting element. Two ends of the support element are pivoted respectively to the rear end of the base and the display module. The sliding assembly includes a slide guiding structure disposed in the second area and a sliding element moving along the slide guiding structure. The sliding element includes an engaging portion for detachably engaging with the connecting element. When the connecting end of the display module moves from the second area to the first area with the sliding element, the connecting end is moved to stride across the first area by detaching the connecting element from the engaging portion.

19 Claims, 15 Drawing Sheets

PORTABLE COMPUTER

BACKGROUND OF THE INVENTION

1. Field of the Invention

The present invention relates to a portable computer, and more particularly, to a portable computer which can change placements of a display thereof.

2. Description of the Related Art

Computing devices have become an indispensable part of our daily life. With the fast development of touch technologies, most hand-held devices or electronic devices such as tablet PC, smart phone, and PDA now provide touch panels instead of mouse or keyboard as input devices, these devices are equipped with operating system supporting touch functions to enable intuitive and convenient operations.

As notebook PCs are usually equipped with QWERTY keyboards and touch pads for input functions and they also use operating system which does not support touch functions or interfaces which cannot recognize touch gestures, so few notebook PCs provide touch functions or designs in the past. However, as software vendors are rolling out new operating system which can support touch functions and people are becoming familiar with touch gestures required to operate tablet PCs or smart phones, it is now necessary for manufactures to provide functions to transform their notebook PCs into tablet PCs. For allowing a display to be rotated around a main body of a notebook PC, a prior art notebook PC uses a support arm or linkage assembly to support the display and pivotally connect the display to the main body, and uses a corresponding sliding assembly to change placements of the display.

In prior art technique such as Taiwan patent No. I316666 (U.S. Pat. No. 7,184,263B1), a portable computer uses a sheet-like support element to support a display and to let the display slide relative to the computer body via guide grooves on both sides of the keyboard to stand upright. In another prior art technique such as Taiwan patent No. 566583, a display of a notebook PC rotatably moves relative to a base via a plurality of linkage rods to change a viewing angle for the user.

However, for the structure of a rotatable display relative to the main body, the prior art has to take into account a keyboard module and to place corresponding sliding elements in a way that the sliding elements are not hindered by the keyboard module to let the sliding elements operate smoothly. Therefore, the sliding elements are usually placed at two sides of the keyboard module and are formed symmetrically to move the display smoothly. However, this design comprises complicated design which involves the operations of pivoting, linking and sliding and various linkage elements to work. Therefore, it is disadvantageous to assemble and to operate the mechanism. Besides, with a complicated mechanism and exposed support and linkage mechanisms on both sides of the display, it is aesthetically unpleasant and is possible to hurt the user if the user's finger accidentally gets pinched between these mechanisms. Additionally, when the display is moving, the support/sliding elements on both sides of the keyboard module have to move symmetrically and synchronously to avoid any obstruction during the operation; if one sliding element is damaged, then the display cannot rotate or move as required.

Therefore, it is necessary to provide a structure which can slide and rotate the display without being interfered by the keyboard module for the portable computer.

SUMMARY OF THE INVENTION

It is an object of the present invention to provide a portable computer which can change placements of a display thereof.

In order to achieve the above object, a portable computer of the present invention comprises a base, a display module, a support element, and a sliding assembly. The base comprises a front end, a rear end, and a front side and a rear side between the front end and the rear end. A first area is defined at the front side and a second area is defined at the rear side. The display module comprises a connecting end, a display face, and a support plane opposite to the display face, and the connecting end comprises a connecting element. The support element comprises a first fixed end and a second fixed end; the first fixed end is pivotally connected to the support plane of the display module so that the display module movies able to rotate relative to the support element, and the second end of the support element is pivotally connected to the rear end of the base or a proximity of the rear end of the base so that the support element is able to rotate relative to the base. The sliding assembly comprises a slide element and a slide guiding structure, wherein the slide guiding structure is disposed at least in the second area of the base; the sliding element moves along the slide guiding structure, and the sliding element comprises an engaging portion for detachably engaging with the connecting element of the display module.

When the connecting end of the display module moves in the second area of the base, the connecting element engages with the engaging portion of the sliding element, to slide on the slide guiding structure with the sliding element; but when the connecting end of the display module moves from the second area to the first area, the connecting end disengages with the engaging portion of the sliding element to stride across the first area.

In an embodiment of the present invention, the sliding assembly further comprises a retaining structure movably engaging with the sliding element to prevent timely the connecting element from disengaging with the engaging portion, and the retaining structure shifts relative to the sliding element to allow the connecting element to disengage with the sliding element when the sliding element approaches the first area from the second area. The sliding assembly further comprises an elastic element disposed between the retaining structure and the sliding element, and the elastic element allow the retaining structure to return to an original position after the retaining structure shifts relative to the sliding element.

In an embodiment of the present invention, the retaining structure comprises an operating portion, and the base further comprises a pressing portion disposed near a boundary between the first area and the second area, the pressing portion presses the operating portion when the sliding element approaches the first area from the second area, such that the retaining structure shifts relative to the sliding element.

In an embodiment, of the present invention, the sliding element further comprises a positioning structure, and the base further comprises a corresponding positioning structure at the boundary between the first area and the second area; the corresponding positioning structure works with the positioning structure to position the sliding element and to allow the connecting element to disengage with the sliding element. The positioning structure comprises a first positioning portion and a second positioning portion; when the sliding element moves from the second area to the first area to fix the corresponding positioning structure at the first positioning portion, the sliding element is positioned at a first fixed position; when the sliding element keeps moving to fix the corresponding positioning structure at a second fixed position of the second positioning portion, the pressing portion presses the operating portion so that the retaining structure shift relative to the sliding element to release the connecting element retained by the retaining structure, In an embodiment of the present invention, the display module further comprises two auxiliary sliding elements disposed at two sides of the connecting end symmetrically; and the base further comprises two auxiliary sliding structure corresponding to the two auxiliary sliding element and are disposed at two sides of the first area symmetrically.

Through the design of the present invention, when a user moves the display module with respect to the base, the connecting element of the display module can be engaged/disengaged with the sliding element manually or by a linkage structure regardless of the existence of the input module. Therefore, the user can easily adjust the placements of the display module to change different operating states of the portable computer.

DETAILED DESCRIPTION OF THE PREFERRED EMBODIMENT

The advantages and innovative features of the invention will become more apparent from the following detailed description when taken in conjunction with the accompanying drawings.

Figure 1:
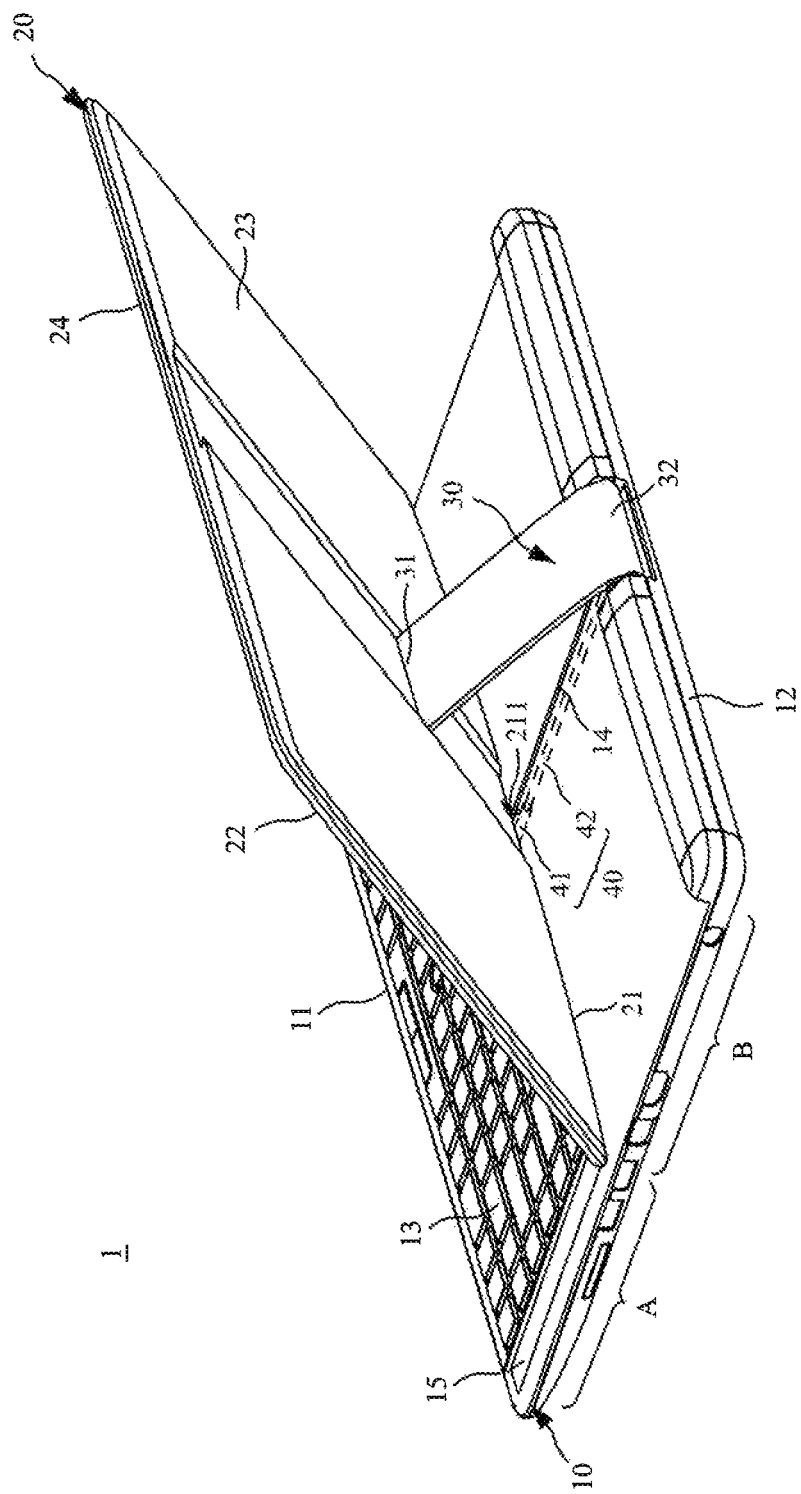
FIG. 1 illustrates a view of the portable computer of the present invention.
Figure 2:
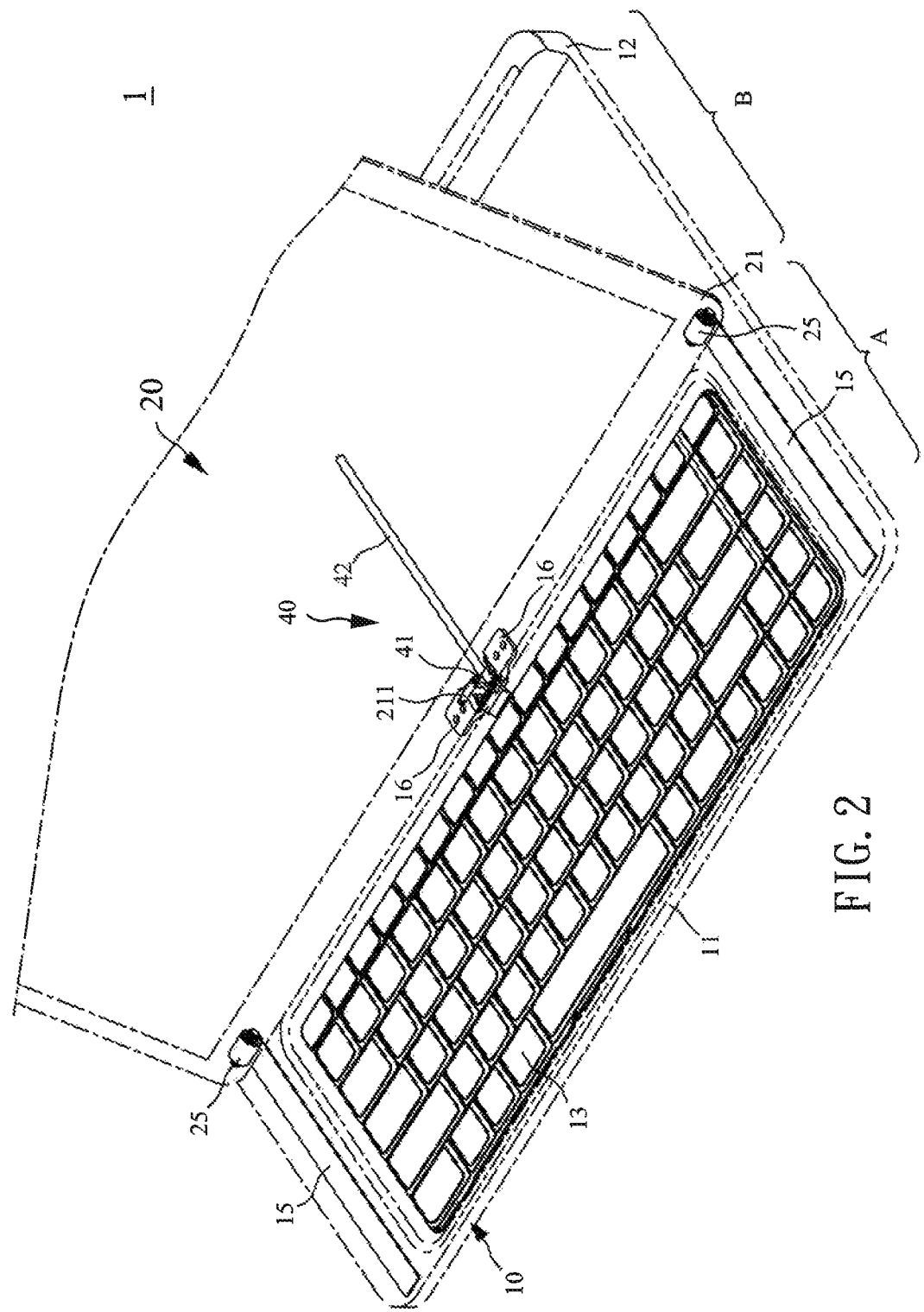
FIG. 2 illustrates a view of the portable computer of the present invention from another viewing angle.

Please refer to both FIG. 1 and FIG. 2. FIG. 1 illustrates a view of the portable computer of the present invention; FIG. 2 illustrates a view of the portable computer of the present invention from another viewing angle. In an embodiment of the present invention, the portable computer 1 is a notebook PC; according to different application needs, the portable computer 1 can be a tablet PC, a netbook PC, or any other electronic device having a flip-cover type of display module.

As shown in FIG. 1 and FIG. 2, the portable computer 1 comprises a base 10, a display module 20, a support element 30 and a sliding assembly 40. Main computing components and related electronic components are disposed at the interior of the base 10. In this embodiment, the base 10 comprises a front end 11, a rear end 12, and a front side and a rear side between the front end 11 and the rear end 12 of the base 10. The base 10 defines a first area A and a second area B between a front end 11 and a rear end 12. The first, area A is defined at the front side, and the second area B is defined at the rear side. The first area A is disposed with an input module 13 consisted of a keyboard, a touch panel, or the like. The base 10 further comprises two auxiliary sliding structures 15 disposed at two sides of the input module 13 respectively. When the display module 20 slides on the base 10 to move from the second area B to the first area A and strides across the input module 13, the two auxiliary sliding structure 15 assists the display module 20 for maintaining sliding direction, absorbing shock and reducing friction. In this embodiment, the auxiliary sliding structure 15 is a sheet-like material attached to or embedded to the surface of the base 10. The material has a smooth surface and a magnetic attraction property, such as a structure combining a Teflon material and an iron plate stacked thereon; however, any material which can attract metal (such as magnet) or can be attracted by magnet (such as iron plate) can be used. Besides, the base 10 further comprises a corresponding positioning structure 16 disposed at a boundary between the second area B and the first area A for positioning the sliding element 41 of the sliding assembly 40.

The display module 20 comprises a connecting end 21, a display face 22, a support plane 23 and a free end 24. The display face 22 opposes to the support plane 23, and the connecting end 21 opposes to the free end 24. The connecting end 21 comprises the connecting element 211, which is disposed at a center or near the center of the connecting end 21 (the number and the position of the connecting elements 211 are not limited) for detachably corresponding to the sliding element 41 of the sliding assembly 40. Based on different design, the connecting element 211 can be a rod element, a buckling element, or a positioning element pivotally connected to the display module 20, such that the connecting element 211 can rotate relative to the display module 20. However, the structure of the connecting element 211 of the present invention is not limited thereto.

The display module 20 further comprises two auxiliary sliding element 25 disposed at two sides of the connecting end 21 symmetrically, and the two auxiliary sliding element 25 are disposed with respect to the two auxiliary sliding structure 15 of the base 10. In this embodiment, the auxiliary sliding element 25 is a magnetic element pivotally connected to the connecting end 21 to roll relative to the display module 20. The auxiliary sliding element 25 can be a cylindrical or a ball-shaped magnet to be attached to the auxiliary sliding structure 15 through a magnetic force, and the auxiliary sliding element 25 can slide relative to base 10 and roll along with the connecting end 21 of the display module 20 on the auxiliary sliding structure 15. The auxiliary sliding element 25 can have any form of structure as long as it can serve the purpose. It is easily known by a person skilled in the art that both the auxiliary sliding element 25 and the auxiliary sliding structure 15 can be magnetic elements (such as magnet), or one of them is a magnetic element, and the other is a magnetic attract element. All these elements fall within the scope of the claims of the present invention or their equivalents.

The support element 30 comprises a first fixed end 31 and a second fixed end 32. The first fixed end 31 is pivotally connected to the display module 20 at a position other than the display face 22 (such as the support plane 23) via a hinge to form a rotatable pivoting point, so that the display module 20 is able to rotate relative to the support element 30. The second end 32 is also pivotally connected to the rear end 12 of the base 10 or near the rear end 12 via a hinge to form another rotatable pivoting point, so that the support element 30 is able to rotate relative to the base 10. In this embodiment, a single support element 30 is used, but the number and the position of the support elements 30 are not limited.

The sliding assembly 40 comprises a sliding element 41 and a slide guiding structure 42. The slide guiding structure 42 is fixedly disposed in the second area B of the base 10. In this embodiment, the slide guiding structure 42 is at or near the center of the second area B (or disposed according to the actual position and the number of the connecting elements 211 of the display module 20). The sliding element 41 provides sliding function and engages with the connecting end 21 of the display module 20. The sliding element 41 slides along the slide guiding structure 42 and at least slides between the rear end 12 of the base 10 and the second area B of the input module 13. A slit 14 is disposed at the center of the top of the second area B, wherein the sliding assembly 40 is disposed in the base 10 and corresponds to the slit 14, so the sliding element 41 can go through the slit 14 and slide in the second area B.

In the embodiments described below, the slide guiding structure 42 is a rod element, and the sliding element 41 is a sleeve element combining with the rod element to slide along the rod element; however, in the present invention, the slide guiding structure 42 can be replaced with a sliding track, and the sliding element 41 can be replaced with a slider block disposed in the sliding track to slide along the sliding track.

Please refer to FIG. 3(*a*), FIG. 3(*b*), and FIG. 3(*e*). FIG. 3(*a*) illustrates a view of the portable computer in a closed state; FIG. 3(*b*) illustrates a view of the portable computer in a normal operating state; and FIG. 3(*c*) illustrates a view of the portable computer in a tablet state.

As shown in FIG. 3(*a*), when the portable computer 1 is in a closed state, the display module 20 is stacked on the base 10, and the connecting element 211 of the connecting end 21 is combined with the sliding element 41, at this time the display face 22 of the display module 20 faces towards the base 10. The support element 30 is also stacked on the display module 20 and is pivotally connected to the rear end 12 of the base 10 and the display module 20 via the first fixed end 31 and the second fixed end 32 respectively.

As shown in FIG. 3(*a*) and FIG. 3(*b*), when a user applies a force on the free end 24 opposite to the connecting end 21 of the display module 20 to move the display module 20 out of its closed state, at first the display module 20 moves with the support element 30 by using the second end 32 as a pivoting point to rotate relative to the base 10. When the display module 20 rotates to a certain angle, the display module 20 starts using the first end 31 of the support element 30 as a pivoting point to rotate relative to the support element 30. In the meantime, the display module 20 uses the connecting element 211 as a pivoting point to rotate relative to the sliding element 41 and pushes the sliding element 41 forward; wherein the sliding element 41 in turn drives the connecting end 21 of the display module 20 to slide towards the front end 11 of the base 10, and then the sliding element 41 is stopped and positioned when the connecting end 21 approaches the input module 13. At this time the portable computer 1 acts like a normal notebook PC.

According to a different embodiment, when the user keeps applying force to the free end 24 of the display module 20 to let the sliding element 41 push continuously the connecting end 21 of the display module 20 to move towards the front end 11 of the base 10, the connecting element 211 disengages with the sliding element 41 (or the user manually disengages them). Then the connecting end 21 strides across the input module 13 to slide towards the front end 11 of the base 10, and eventually the display module 20 is stacked on the base 10 with the support plane 23 of the display module 20 facing towards the base 10. At this time the portable computer acts like a tablet PC, as shown in FIG. 3(*c*). When the portable computer 1 changes its state from that shown in FIG. 3(*b*) to FIG. 3(*c*), the connecting end 21 of the display module can stably slide relative to the base 10 with little friction by using the auxiliary sliding element to cooperate with the auxiliary sliding structure (please refer to FIG. 2) corresponding to the base 10.

Figure 4A:
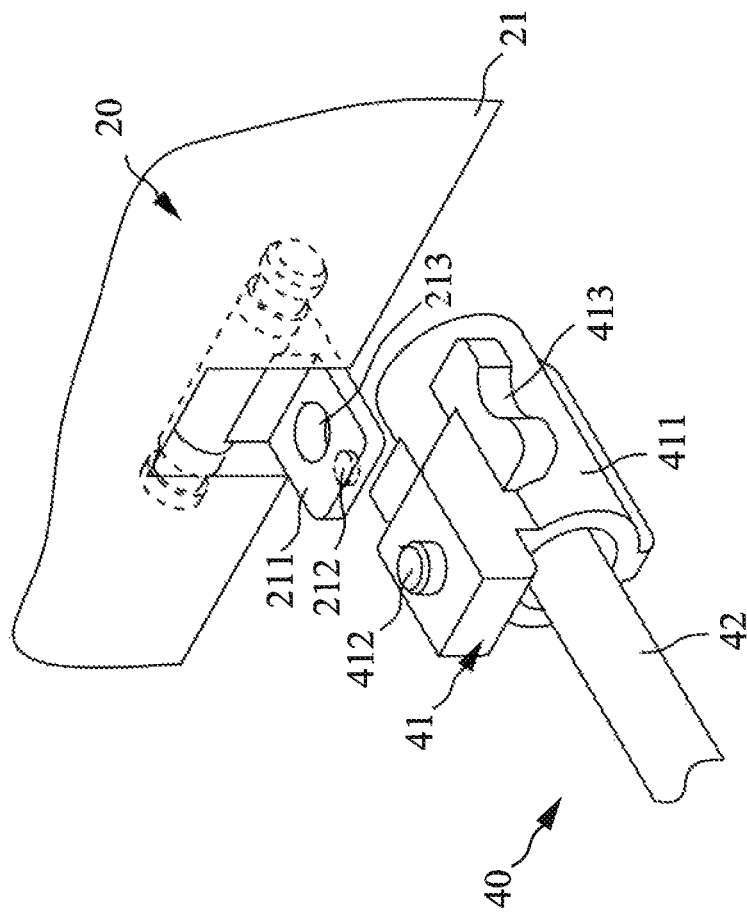
FIG. 4(a) illustrates a view of a first embodiment of a display module and a sliding assembly of the portable computer of the present invention.

Please refer to FIG. 4(*a*), FIG. 4(*b*) and FIG. 4(*c*). FIG. 4(*a*) illustrates a view of a first embodiment of a display module 20 and a sliding assembly 40 of the portable computer of the present invention; FIG. 4(*b*) illustrates a view of a first embodiment of the display module 20 engaging with the sliding element 41 of the portable computer of the present invention; and FIG. 4(*c*) illustrates a view of a first embodiment of the display module 20 disengaging with the sliding element 41 of the portable computer of the present invention.

As shown in FIG. 4(*a*), the sliding element 41 of the sliding assembly 40 comprises a sliding portion 411, an engaging portion 412, and a positioning structure 413. The sliding portion 411 is movably engaged with the slide guiding structure 42, the engaging portion 412 is detachably engaged with the connecting element 211 of the display module 20, and the positioning structure 413 is connected to the sliding portion 411. In this embodiment, the engaging portion 412 is a protruding structure (such as a protruding block or column), and the connecting element 211 of the display module 20 comprises a recess 213 corresponding to the protruding structure. Furthermore, the connecting element 211 can comprise a magnetic element 212 disposed at the surface of the connecting element 211 or in the connecting element 211. The magnetic element 212 works with the sliding element 41 formed by a magnetic attract material or a corresponding magnetic element disposed at the sliding element 41, to provide the magnetic attraction function when the connecting element 211 engages with the engaging portion 412. It can ensure the connecting element 211 being held firmly at an engaging position to engage the engaging portion 412.

When the portable computer 1 is changing its state from that shown in FIG. 3(*a*) to FIG. 3(*b*), the recess 213 of the connecting element 211 of the display module 20 is engaged with a corresponding part of the engaging portion 412 of the sliding element 41, as shown in FIG. 4(*b*); therefore, the connecting element 211 moves with the sliding element 41 to drive the connecting end 21 of the display module 20 to move.

Figure 3A:
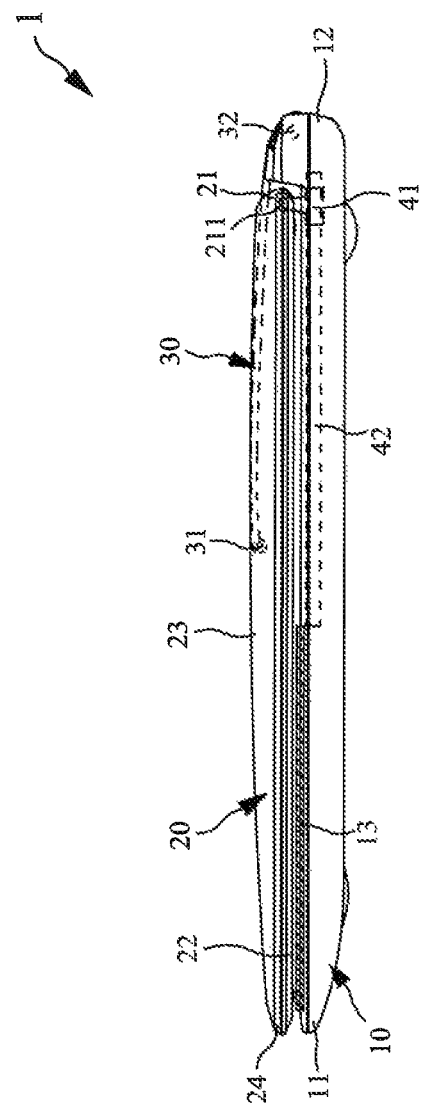
FIG. 3(a) illustrates a view of the portable computer in a closed state.
Figure 3B:
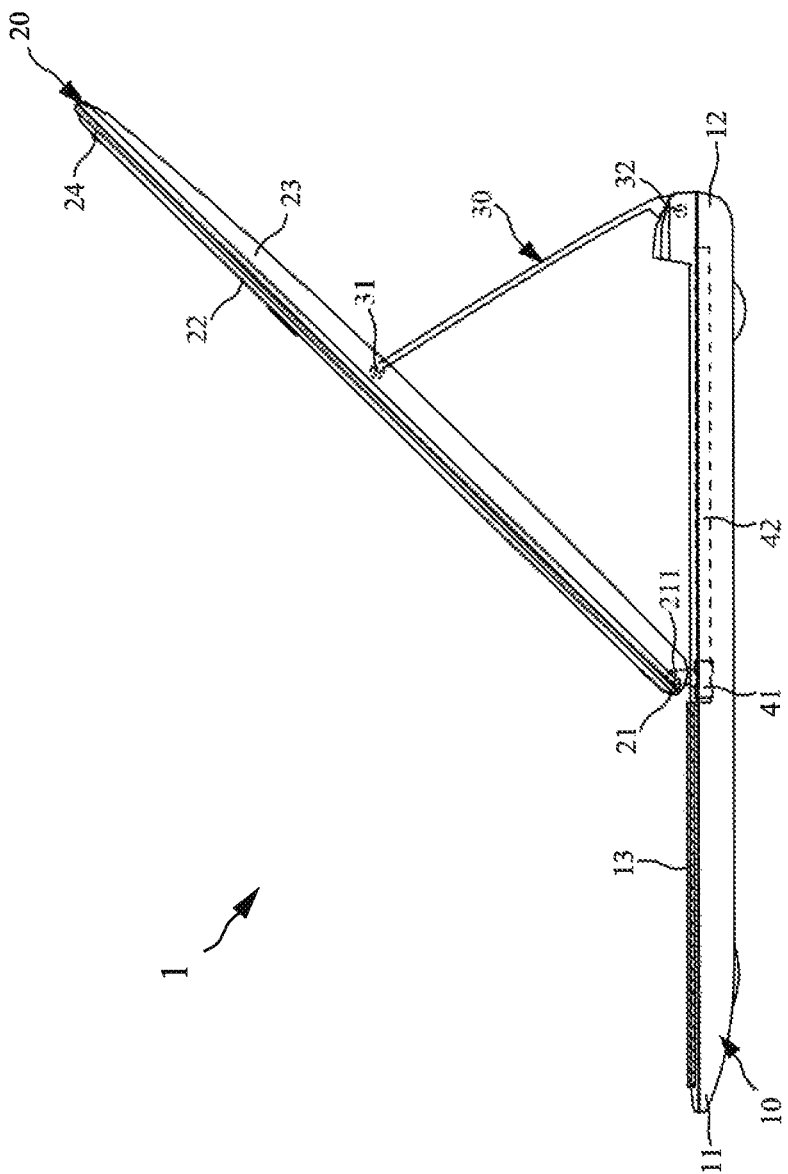
FIG. 3(b) illustrates a view of the portable computer in a normal operating state.

When the sliding element 41 slides to the position shown in FIG. 3(b), the positioning structure 413 of the sliding element 41 works with the corresponding positioning structure of the base 10 disposed near the input module (though not shown in the figure, one can refer to the corresponding positioning structure 16 shown in FIG. 2) to position the sliding element 41. In this embodiment, the positioning structure 413 and the corresponding positioning structure can be a protruding block and a recess respectively to work with each other, though the present invention can have other structural implementation.

Figure 3C:
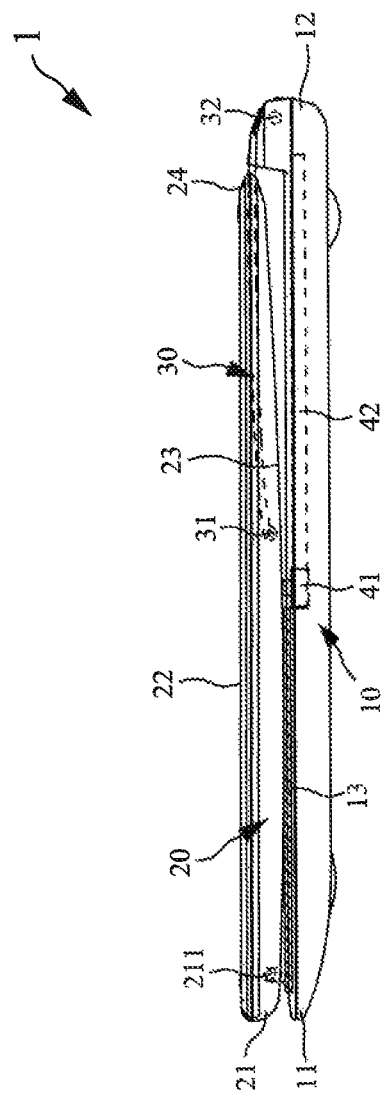
FIG. 3(c) illustrates a view of the portable computer in a tablet state.
Figure 4C:
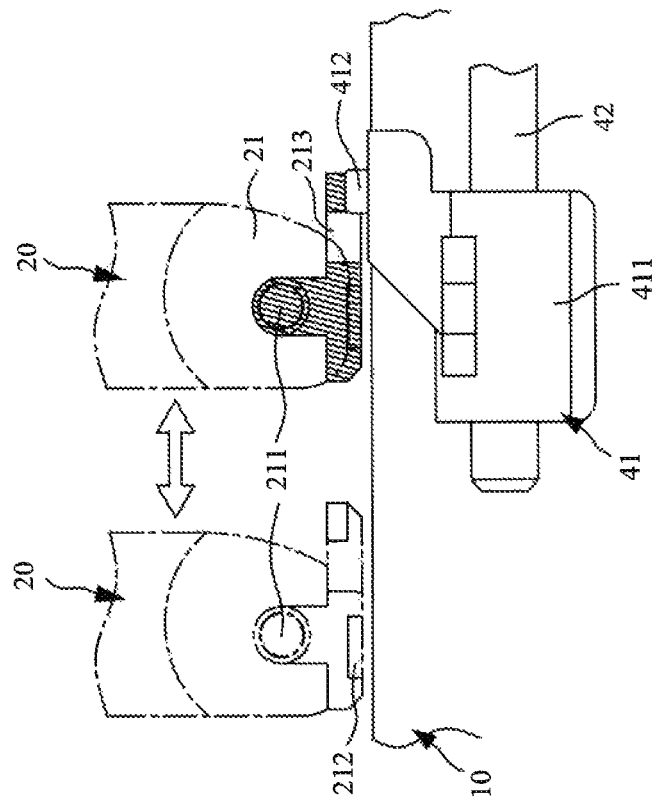
FIG. 4(c) illustrates a view of the first embodiment of the display module disengaging with the sliding element of the portable computer of the present invention.
Figure 4B:
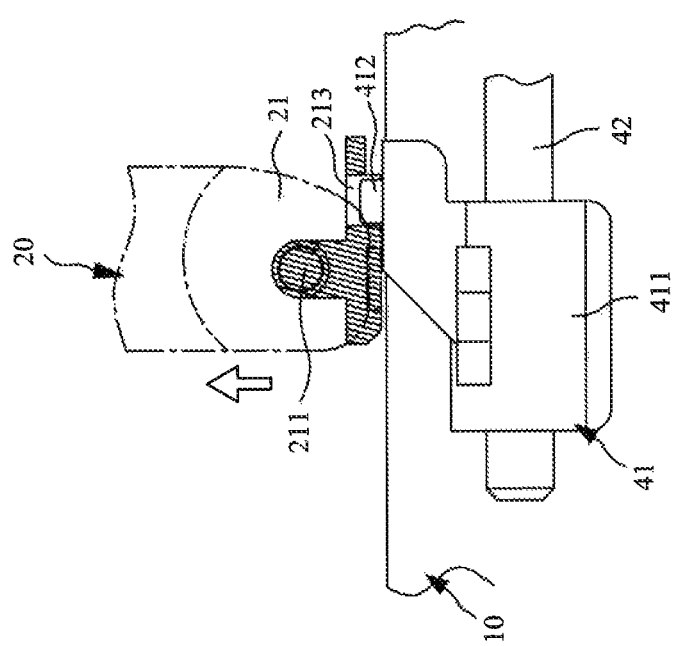
FIG. 4(b) illustrates a view of the first embodiment of the display module engaging with the sliding element of the portable computer of the present invention.

At this time, the user cars manually move the connecting end 21 of the display module 20 in FIG. 4(b) for a distance to separate the recess 213 of the connecting end 21 from the engaging portion 412. Then the user keeps applying a force on the display module 20 to move continuously the connecting end 21 of the display module 20 relative to the base 10, as shown in FIG. 4(c), until the display module 20 is stacked on the base 10. In contrast, when the portable computer changes its state from that shown in FIG. 3(c) to FIG. 3(b), as the connecting end 21 moves towards the sliding element 41, the magnetic element 212 can attract the sliding element 41 itself or the corresponding magnetic element in the sliding element 43 due to the magnetic attract property, so as to hold the connecting element 211 at the engaging position. After that the connecting element 211 is able to engage with the engaging portion 412 and go back to the engaging state shown in FIG. 4(b).

Figure 5A:
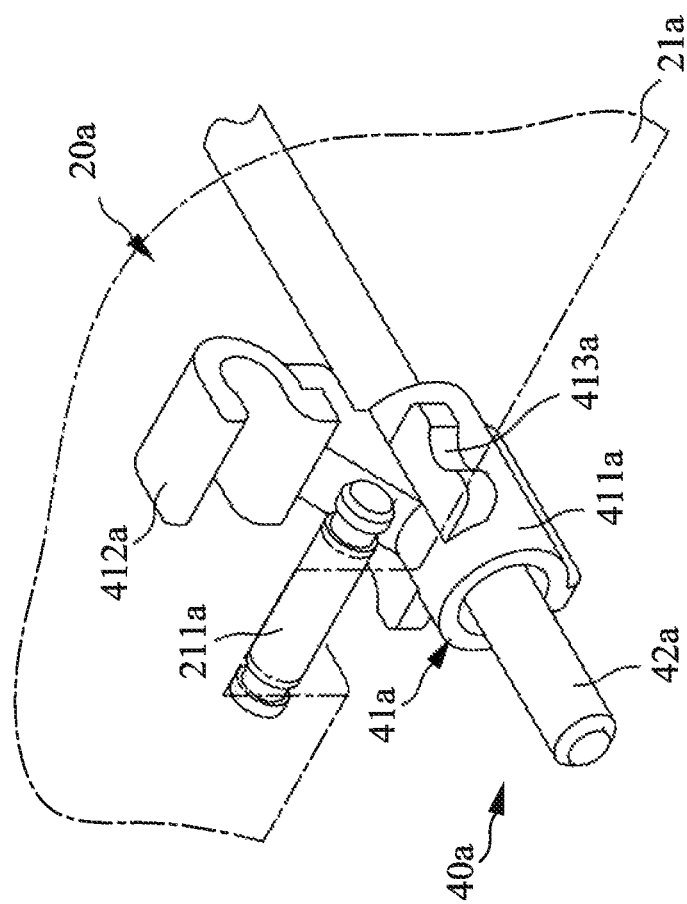
FIG. 5(a) illustrates a view of a second embodiment of the display module engaging with the sliding assembly of the portable computer of the present invention.
Figure 5B:
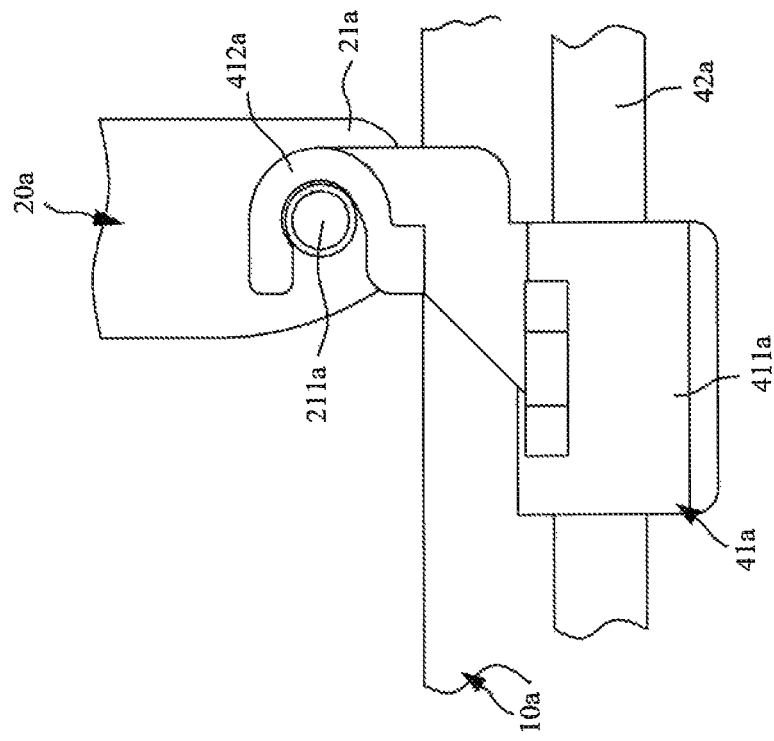
FIG. 5(b) illustrates a view of the second embodiment before the display module engaging with the sliding element of the portable computer of the present invention.
Figure 5C:
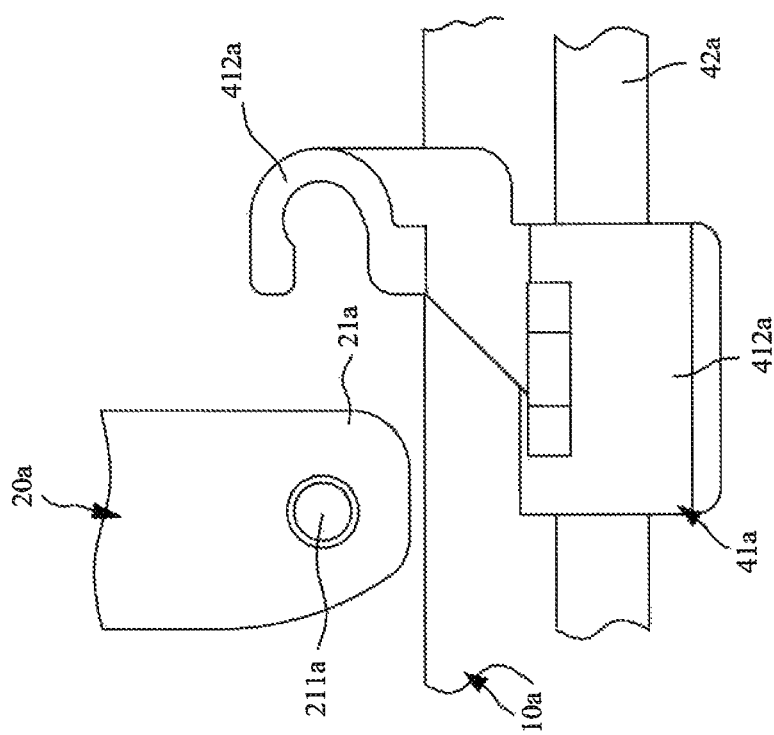
FIG. 5(c) illustrates a view of the second embodiment after the display module engaging with the sliding element of the portable computer of the present invention.

Please refer to FIG. 5(a), FIG. 5(b) and FIG. 5(c). FIG. 5(a) illustrates a view of a second embodiment of the display module 20a and the sliding assembly 40a of the portable computer of the present invention; FIG. 5(b) illustrates a view of a second embodiment of before the display module 20a engaging with the sliding element 41a of the portable computer of the present invention; and FIG. 5(c) illustrates a view of a second embodiment of after the display module 20a engaging with the sliding element 41a of the portable computer of the present invention.

This embodiment is a variation of the first embodiment. As shown in FIG. 5(a), the engaging portion 412a of the sliding element 41a is a C-shaped hook, and the connecting element 211a of the display module 20a is a rod element corresponding to the C-shaped hook. When the portable computer 1 is moving from a closed state as shown in FIG. 3(a) to a normal operating state as shown in FIG. 3(b), the connecting element 211a of the display module 20a is engaged with the engaging portion 412a of the sliding element 41a, as shown FIG. 5(b). Therefore, the connecting element, 211a slides with the sliding element 41a to drive the connecting end 21a of the display module 20a to move. Similarly, when the sliding element 41a slides to the position shown in FIG. 3(b), the positioning structure 413a of the sliding element 41a works with the corresponding positioning structure (not shown in figure) of the base 10a to position the sliding element 41a.

At this time, the user can apply a greater force to the display module 20a to let the connecting element 221a of the connecting end 21a separate from the engaging portion 412a automatically (or the user can separate the connecting element 211a and the engaging portion 412a manually), so that the connecting end 21a of the display module 20a moves continuously relative to the base 10a, as shown in FIG. 5(c), until the display module 20a is stacked on the base 10a. In contrast, when the portable computer changes its state from that shown in FIG. 3(c) to FIG. 3(b), as the connecting end 21a moves towards the sliding element 41a, the connecting element 211a is able to engage with the engaging portion 412a to go back to the engaging state shown in FIG. 5(b).

Figure 6:
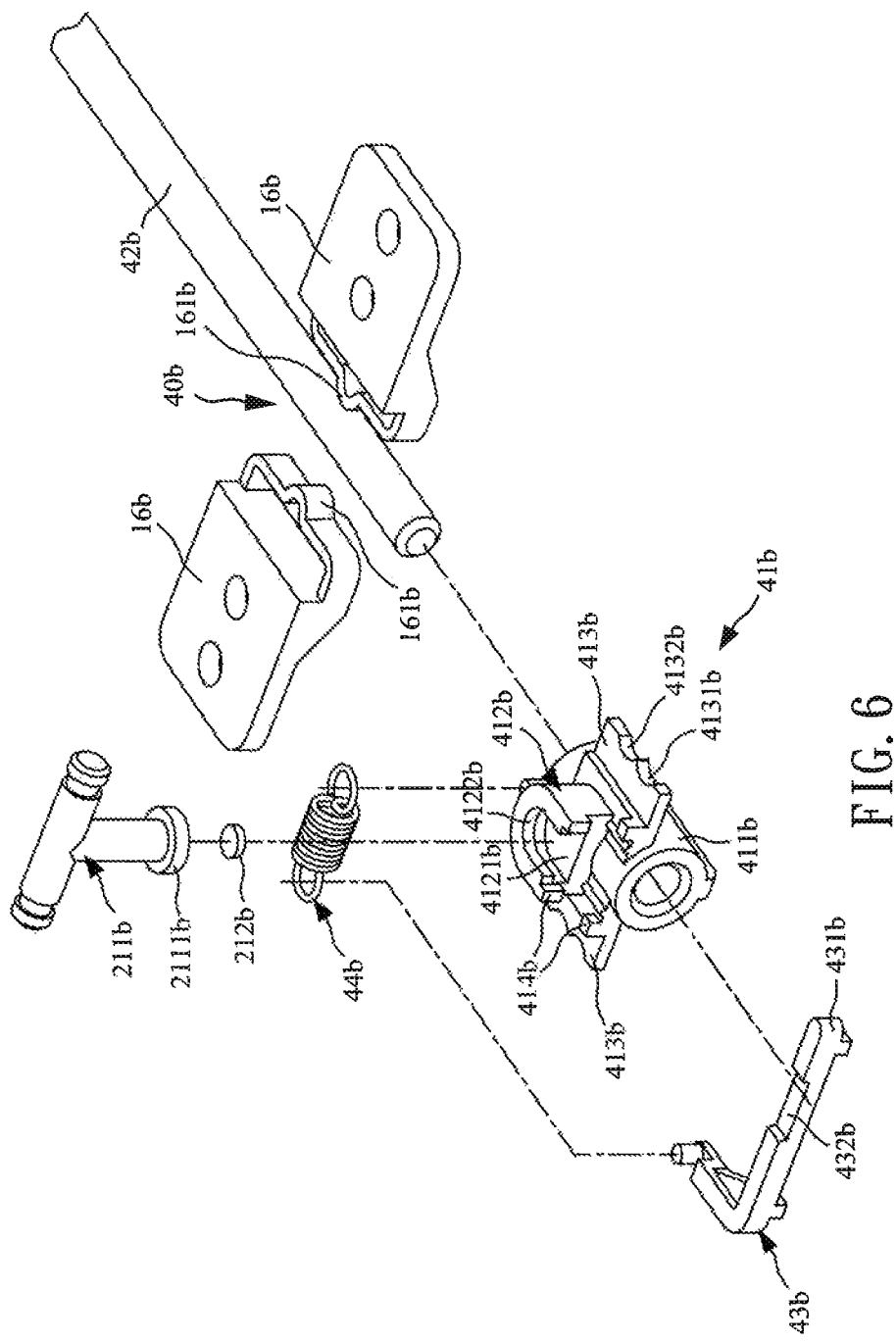
FIG. 6 illustrates a view of a third embodiment of a connecting element and a sliding assembly corresponding to a base of the portable computer of the present invention.
Figure 7A:
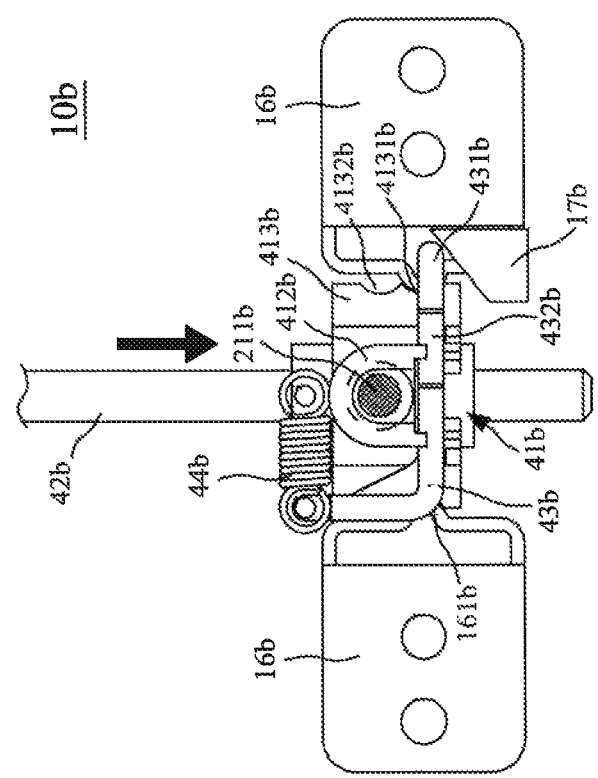
FIG. 7(a) illustrates a top view of the third embodiment of the connecting element engaging with the sliding element of the portable computer of the present invention.
Figure 7B:
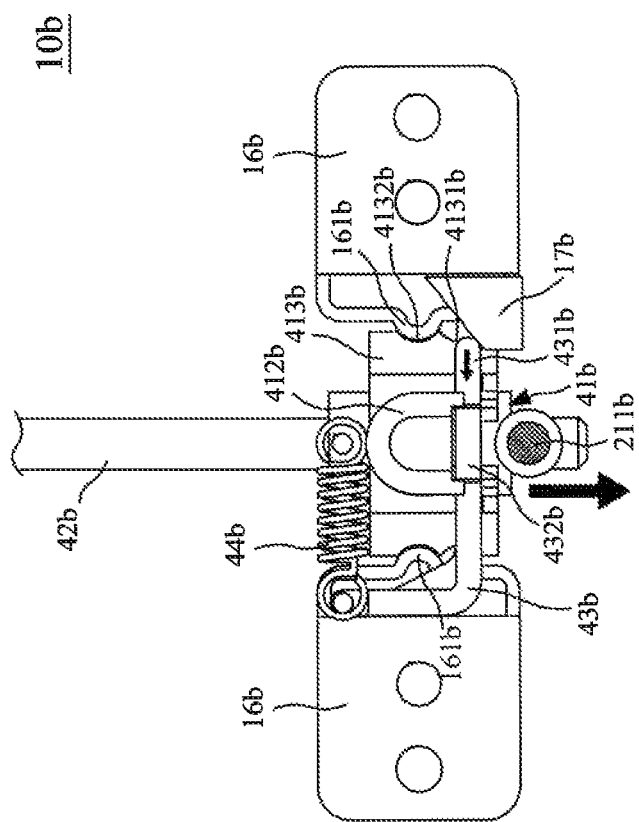
FIG. 7(b) illustrates a top view of the third embodiment of the connecting element disengaging with the sliding element of the portable computer of the present invention.

Please refer to FIG. 6, FIG. 7(a), and FIG. 7(b) all together. FIG. 6 illustrates a view of a third embodiment of a connecting element 211b and a sliding assembly 40b corresponding to a base of the portable computer of the present invention; FIG. 7(a) illustrates a top view of the third embodiment of the connecting element 211b engaging with the sliding element 41b of the portable computer of the present invention; and FIG. 7(b) illustrates a bird's eye view of the third embodiment of the connecting element 211b disengaging with the sliding element 41b of the portable computer of the present invention. It is noted that the sliding assembly 40b shown in FIG. 6, FIG. 7(a), and FIG. 7(b) is disposed at the base 10b, and the connecting element 211b is disposed at the display module. In the figures, only part of the base 10b corresponding to the sliding assembly and the connecting element is shown to better illustrate the structures and operations of the sliding assembly 40b and the connecting element 211b.

As shown in FIG. 6, the sliding element 41b of the sliding assembly 40b comprises a sliding portion 411b, an engaging portion 412b, and a positioning structure 413b; the sliding portion 411b is movably connected to the slide guiding structure 42b. In this embodiment, the engaging portion 412b is formed as a U-shaped compartment for disposing the protruded ring portion 2111b of the connecting element 211b. The magnetic element 212b is combined with the protruded ring portion 2111b. The engaging portion 412b comprises an opening 4121b and a flange 4122b. The opening 4121b is provided for allowing the protruded ring portion 2111b of the connecting element 211b to enter or exit the compartment; and the flange 4122b retains the protruded ring portion 2111b when the connecting element 211b enters the compartment through the opening 4121b to prevent the protruded ring portion 2311b of the connecting element 211b from disengaging with the engaging portion 412b from positions other than the opening 4121b. The positioning structure 413b is connected to the sliding portion 411b, wherein the positioning structure 413b comprises a first positioning portion 4131b and a second positioning portion 4132b to provide the positioning function at different positions. Furthermore, the base 10b further comprises a corresponding positioning structure 16b corresponding to the positioning structure 413b. The corresponding positioning structure 16b is disposed at or near the boundary between the first area A and the second area B and comprises at least one interference point 161b.

The sliding assembly 40b further comprises a retaining structure 43b movably connected to the sliding element 41b to suitably prevent the connecting element 211b from disengaging with the engaging portion 412b, and the retaining structure 43b can shift relative to the sliding element 41b in a direction substantially perpendicular to the sliding direction of the sliding element 41b to release the connecting element 211b. In this embodiment, the retaining structure 43b comprises an operating portion 431b and a through portion 432b. The operating portion 431b works with the corresponding structure of the base 10b to let the retaining structure 43b shift laterally with respect to the sliding element 41b, and the through portion 432b allows the connecting element 211b to go through. Therefore, by the through portion 432b moves with the retaining structure 43b to shift laterally, the position of the through portion 432b relative to the connecting element 211b is changed to be an open or a closed state. The base 10b further comprises a pressing portion 17b (shown in FIG. 7(a) and FIG. 7(b)), which is also disposed at or near the boundary between the first area and the second area to suitably press the operating portion 431b. When the through portion 432b is at the opening 4121, the protruded ring portion 2111b of the connecting element 211b is allowed to go through. Therefore, by shifting the retaining structure 43b laterally with respect to the sliding element 41b to change the position of the through portion 432b to be at the opening 4121b or a position other than the opening 4121b, the connecting element 211b can selectively disengage or engage with the engaging portion 412b. In this embodiment, the retaining structure 43b is a rod element and the operating portion 431b is a circular end portion of the rod element, and the pressing portion 17b is a structure having a incline plane. However, the retaining structure, the operating portion, and the pressing portion can have any other types.

Besides, the sliding assembly 40b further comprises an elastic element 44b disposed between the retaining structure 43b and the sliding element 41b. The elastic element 44b has two ends connected to the retaining structure 43b and the sliding element 41b respectively, so that the retaining structure 43b can return, to an original position by an elastic force of the elastic element 44b after the retaining structure 43b shifts laterally relative to the sliding element 41b.

To ensure the retaining structure 43b shifting relative to the sliding element 41b and then returning to the original position firmly, the sliding element 41b further comprises at least one limiting structure 414b for holding the retaining structure 43b and limiting a moving direction of the retaining structure 43b, so that the retaining structure 43b moves only in the lateral direction as described above.

Please refer to FIG. 6 and FIG. 7(a). When the portable computer of the present application changes its state from that shown in FIG. 3(a) to FIG. 3(b), the connecting element 211b is blocked by the retaining structure 43b to keep engaging with the engaging portion 412b, and the connecting element 211b slides along with the sliding element 41b. When the sliding element 41b keeps moving towards the front end of the base to change the state of the portable computer as shown in FIG. 3(b), the first positioning portion 4131b of the positioning structure 413b of the sliding element 41b engages with the interference point 161b of the corresponding positioning structure 16b of the base first, so as to fix the sliding element 41b at a first fixed position. At this time, the portable computer acts like a normal notebook PC, and the retaining structure 43b is not driven to shift.

Please refer to FIG. 6, FIG. 7(a) and FIG. 7(b). While the sliding element 41b moves continuously towards the first area of the base to let the interference point 161b disengage with the first positioning portion 4131b and move to engage with the second positioning portion 4132b, the operating portion 431b of the retaining structure 43b is pushed by the incline plane of the pressing portion 17b of the base 10b, so that the retaining structure 43b shifts laterally in the direction substantially perpendicular to the sliding direction of the sliding element 41b. When the second positioning portion 4132b of the positioning structure 413b of the sliding element 41b engages with the corresponding positioning structure 16b, the sliding element 41b is fixed at the second fixed position. At this time, the through portion 432b of the retaining structure 43b is moved to the position corresponding to the opening of the engaging portion 412b by the movement of the retaining structure 43b, so as to release the connecting element 211b; it is noted that the retaining structure 43b is still pushed by the pressing portion 17b and remains in the open state, as shown in FIG. 7(b). Therefore, the connecting element 211b can pass through the through portion 432b to disengage with the engaging portion 412b, and the connecting end of the display module can slide continuously towards the first area shown in FIG. 2, so as to change the portable computer to the tablet state shown in FIG. 3(c).

In contrary, when the portable computer of the present application changes its state from that shown FIG. 3(c) to FIG. 3(b), the connecting end of the display module slides towards the rear end of the base. Since the retaining structure 43b of the sliding element 41b remains at the position shown, in FIG. 7(b), the connecting element 211b can pass through the through portion 432b to engage with the engaging portion 412b. To ensure that the connecting element 211b remaining firmly at the engaging position to pass through the through portion 432b, the connecting element 211b uses the magnetic element 212b to work with the magnetic attract material or the corresponding magnetic element disposed on the sliding element 41b, so that the position of the connecting element 211b can correspond to the position of the engaging portion 412b by a magnetic force; however, the present invention is not limited thereto.

When the user keeps applying force to the display module, the connecting element 211b leans against the flange of the engaging portion 412b, so that the connecting element 21 1b drives the sliding element 41b to move backward. During the sliding element 41b moves backward to allow the interference point 161b to disengage with the second positioning portion 4132b and to move from the second fixed position to the first fixed position, a pushing function of the pressing portion 17b of the base 10b for the retaining structure 43b is gradually disappeared, then the retaining structure 43b is driven by the elastic force of the elastic element 44b to let the through portion 432b of the retaining structure 43b leave the position of the opening of the engaging portion 412b and remain the connecting element 211b again. Then the retaining structure 43b returns to the closed state as shown in FIG. 7(a).

Figure 8:
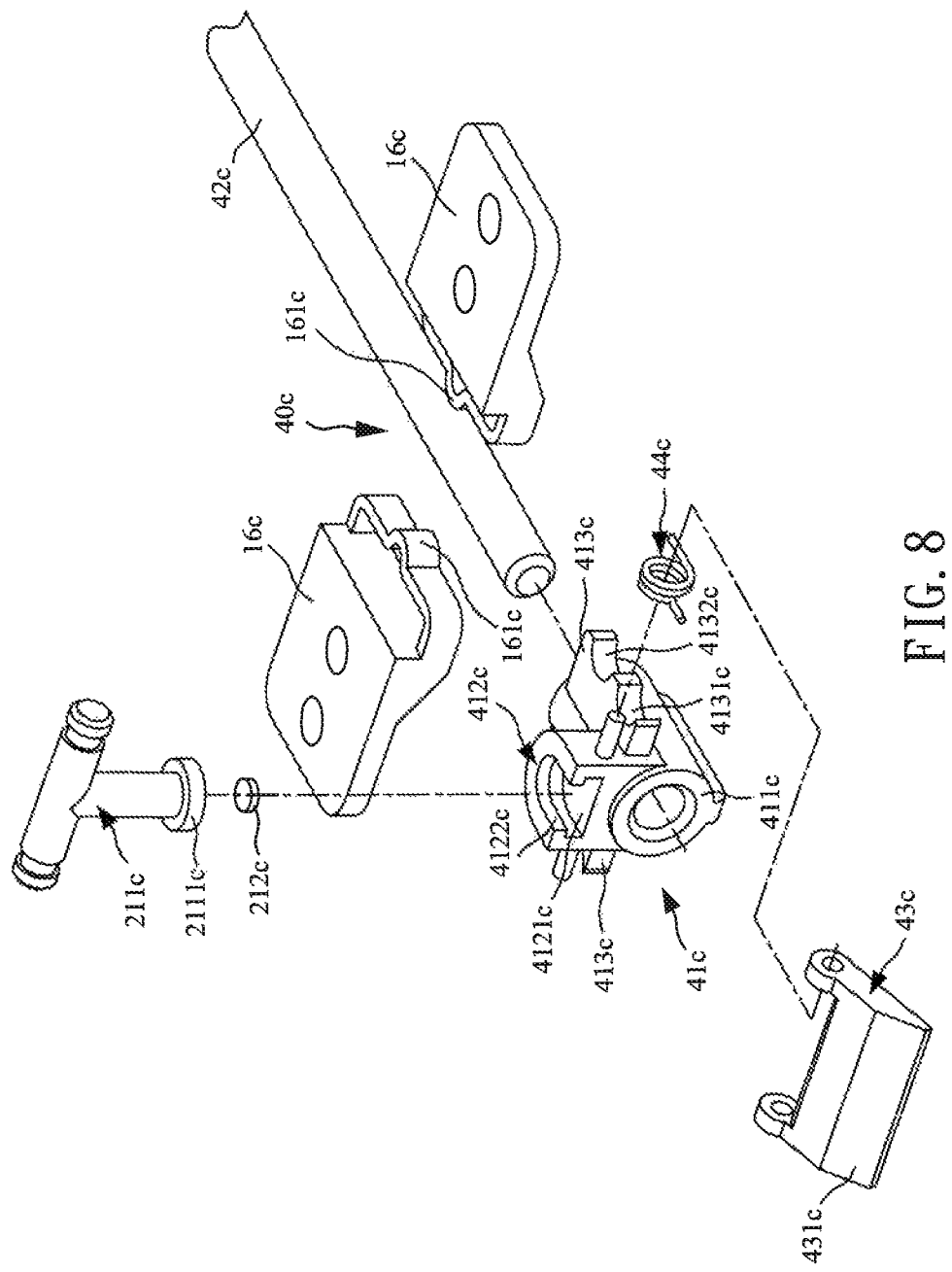
FIG. 8 illustrates a view of a fourth embodiment of the connecting element and the sliding assembly corresponding to the base of the portable computer of the present invention.
Figure 9A:
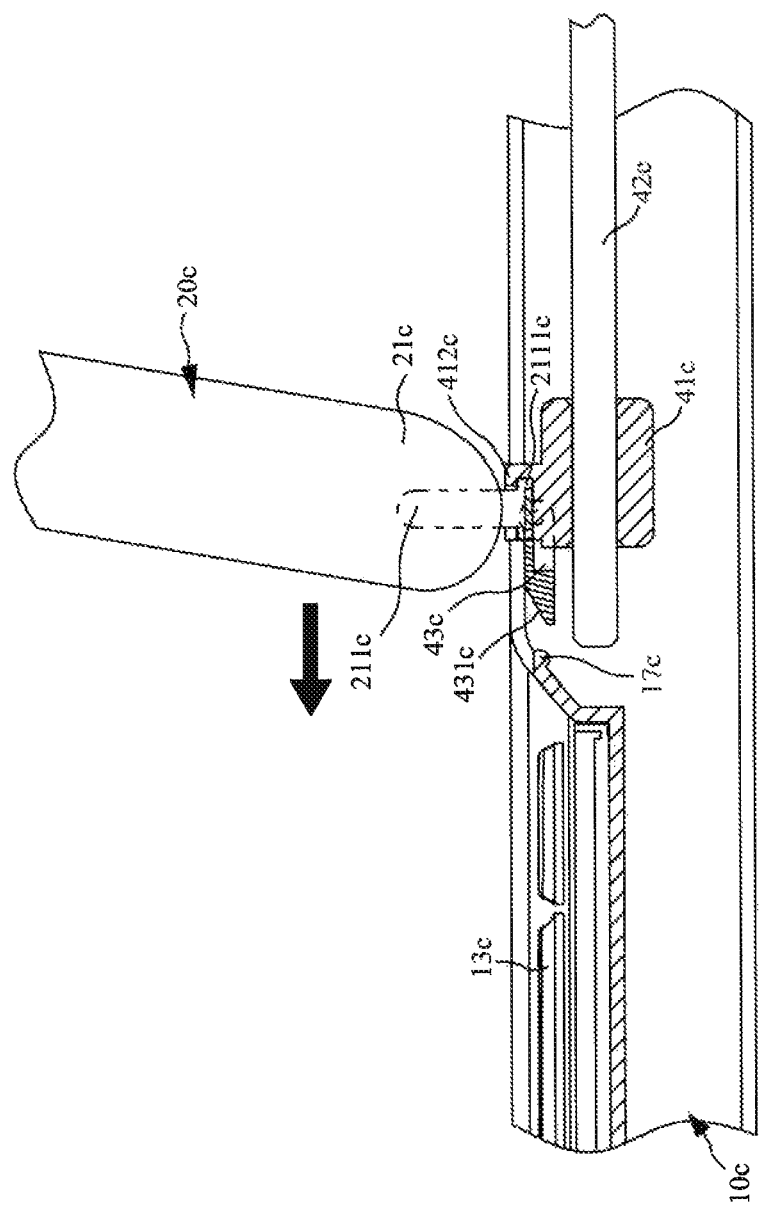
FIG. 9(a) illustrates a top view of the fourth embodiment of the connecting element engaging with the sliding element of the portable computer of the present invention.
Figure 9B:
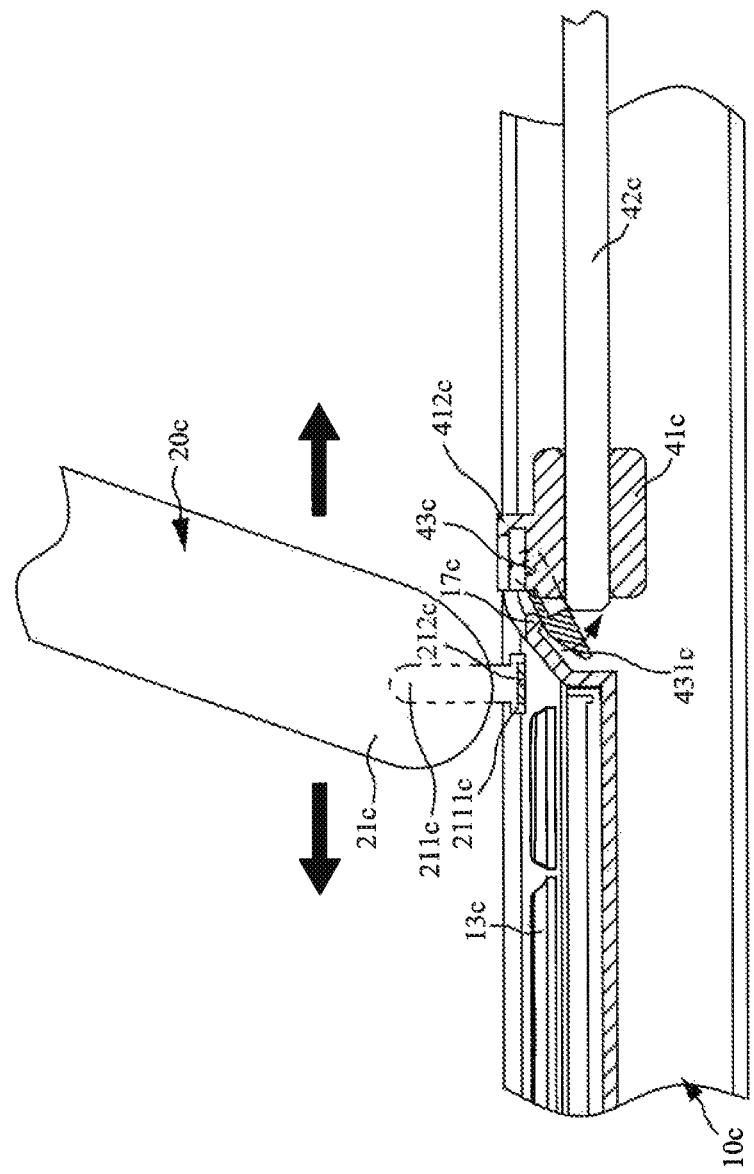
FIG. 9(b) illustrates a top view of the fourth embodiment of the connecting element disengaging with the sliding element of the portable computer of the present invention.

Please refer to FIG. 8, FIG. 9(a), and FIG. 9(b). FIG. 8 illustrates a view of a fourth embodiment of the connecting element 211c and the sliding assembly corresponding to the base of the portable computer of the present invention; FIG. 9(a) illustrates a top view of the fourth embodiment of the connecting element 211c engaging with the sliding element 41c of the portable computer of the present invention; and FIG. 9(b) illustrates a top view of the fourth embodiment of the connecting element 211c disengaging with the sliding element 41c of the portable computer of the present invention. It is noted that the sliding assembly 40c shown in FIG. 8 is disposed at the base 10c, and the connecting element 211c is disposed at the display module. In the figures, only part of the base 10c corresponding to the sliding assembly 40c and the connecting element 211c is shown to better illustrate the structures and operations of the sliding assembly 40c and the connecting element 211c.

As shown in FIG. 8, the sliding element 41c of the sliding assembly 40c comprises a sliding portion 411c, an engaging portion 412c, and a positioning structure 413c, and the sliding portion 411c is movably connected to the slide guiding structure 42c. In this embodiment, the engaging portion 412c is formed as a U-shaped compartment for disposing the protruded ring portion 2111c of the connecting element 211c, and the magnetic element 212c is combined with the protruded ring portion 2111c. The engaging portion 412c comprises an opening 4121c and a flange 4122c. The opening 4121c is provided for allowing the protruded ring portion 2111c of the connecting element 211c to enter or exit the compartment, and the flange 4122c retains the protruded ring portion 2111c when the connecting element 211c enters the compartment through the opening 4121c to prevent the protruded ring portion 2111c of the connecting element 211c from disengaging with the engaging portion 412c from positions other than the opening 4221c. The positioning structure 413c is connected to the sliding portion 411c, wherein the positioning structure 413c comprises a first positioning portion 4131c and a second positioning portion 4132c to provide the positioning function at different positions. Furthermore, the base 10c further comprises a corresponding positioning structure 16c corresponding to the positioning structure 413c. The corresponding positioning structure 16c is disposed near the input module as shown in FIG. 2, and the corresponding positioning structure 16c comprises at least one interference point 161c.

The sliding assembly 40c further comprises a retaining structure 43c movably connected to the sliding element 41c to suitably prevent the connecting element 211c from disengaging with the engaging portion 412c, and the retaining structure 43 c can shift relative to the sliding element 41c to release the connecting element 211c. The retaining structure 43c comprises an operating portion 431c. The operating portion 431c works with the corresponding structure of the base 10c to let the retaining structure 43b rotate and shift with respect to the sliding element 41c so as to release the connecting element 211c. In this embodiment, the retaining structure 43c is pivotally connected to the sliding element 41c, so that the retaining structure 43c can rotate and shift up and down with respect to the sliding element 41c. The operating portion 431b is formed as an incline plane structure; however, the operating portion 431b is not limited thereto.

Besides, the sliding assembly 40c further comprises an elastic element 44c disposed between the retaining structure 43c and the sliding element 41c. The elastic element 44c has two ends connected to the retaining structure 43c and the sliding element 41c respectively, so that the retaining structure 43c can return to an original position by an elastic force of the elastic element 44c after the retaining structure 43c shifts relative to the sliding element 41c.

Please refer to FIG. 8 and FIG. 9(a). The base 10c further comprises a pressing portion 17c disposed near the input module 13c to correspond to push the operating portion 431c. In this embodiment, the pressing portion 17c is a protruded block structure corresponding to the operating portion 431c; however, the pressing portion 17c can have any other implementations.

When the portable computer of the present application changes its state from that shown in FIG. 3(a) to FIG. 3(b), the connecting element 211c is blocked by the retaining structure 43c to keep engaging with the engaging portion 412c, and the connecting element 211c slides along with the sliding element 41c. When the sliding element 41c keeps moving from the second area B to the first area A to change the state of the portable computer as shown in FIG. 3(b), the first positioning portion 4131c of the positioning structure 413c of the sliding element 41c engages with the interference point 161c of the corresponding positioning structure 16c of the base 10c first, so as to fix the sliding element 41c at a first fixed position. At this time, the portable computer acts like a normal notebook PC, and the retaining structure 43c is not driven to shift.

Please refer to FIG. 8, FIG. 9(a) and FIG. 9(b). While the sliding element 41c moves continuously towards the front end of the base to let the interference point 161c disengage with the first positioning portion 4131c and move to engage with the second positioning portion 4132c, the operating portion 431c of the retaining structure 43c is pushed by the pressing portion 17c of the base 10c, so that the retaining structure 43c rotates with respect to the sliding element 43c to move towards the bottom of the base 10c. When the second positioning portion 4132c of the positioning structure 413c of the sliding element 41c engages with the corresponding positioning structure 16c, the sliding element 41c is fixed at the second fixed position. At this time, the retaining structure 43c shifts to release the connecting element 211c; it is noted that the retaining structure 43c is still pushed by the pressing portion 17c and remains in the open state, as shown in FIG. 9(b). Therefore, the connecting element 211c can disengage with the engaging portion 412c, and the connecting end 21c of the display module can slide continuously towards the front end of the base, so as to change the portable computer to the tablet state shown in FIG. 3(c).

In contrary, when the portable computer of the present application changes its state from that shown FIG. 3(c) to FIG. 3(b), the connecting end 21c of the display module slides towards the rear end of the base. Since the retaining structure 43c of the sliding element 41c remains at the position shown in FIG. 9(b), the connecting element 211c can stride across the retaining structure 43c to engage with the engaging portion 412c. To ensure that the connecting element 211c remaining firmly at the engaging position, the connecting element 211c uses the magnetic element 212c to work with the magnetic attract material or the corresponding magnetic element disposed on the sliding element 41c, so that the position of the connecting element 211c can correspond to the position of the engaging portion 412c by a magnetic force; however, the present invention is not limited thereto.

When the user keeps applying force to the display module, the connecting element 211c drives the sliding element 41c to move backward as described in the previous embodiment. A pushing function of the pressing portion 17c of the base 10c for the retaining structure 43c is gradually disappeared, then the retaining structure 43c is driven by the elastic force of the elastic element 44c to block the connecting element 211c again. The retaining structure 43c returns to the closed state as shown in FIG. 9(a).

Through the design of the present invention, during the process of rotating the display module relative to the base and moving the display module towards the front end of the base, the connecting element of the display module can disengage with the sliding element automatically, or the user manually separates the connecting element of the display module and the sliding element. Therefore, the connecting end of the display module can disengage with the sliding element and stride across the input module to allow the portable computer to act like a tablet PC. If the user moves the connecting end of the display module towards the rear end of the base, the connecting element of the display module can also automatically engage with the sliding element to restore the portable computer back to a notebook PC or a closed state. Therefore, it is not necessary to add any linkage means at two sides of the input module or to expand the placement of the sliding assembly to let the portable computer transform into a tablet PC state. It is easier and more convenient to use the portable computer and enhance the stability of the movement of the display module.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:
1. A portable computer comprising:
   a base, with a front side and a rear side between a front end and a rear end thereof, having a first area defined at the front side and a second area defined at the rear side;

a display module comprising a connecting end, a display face, and a support plane opposite to the display face, the connecting end comprising a connecting element;

a support element comprising a first fixed end and a second fixed end, the first end being pivotally connected to a portion of the display module other than the display face so that the display module is able to rotate relative to the support element, the second end of the support element being pivotally connected to the rear end of the base or a proximity of the rear end of the base so that the support element is able to rotate relative to the base; and a sliding assembly comprising a slide element and a slide guiding structure, wherein the slide guiding structure is disposed at least in the second area of the base; the sliding element moves along the slide guiding structure, and the sliding element comprises an engaging portion for detachably engaging with the connecting element of the display module;

when the connecting end of the display module moves in the second area of the base, the connecting element engages with the engaging portion of the sliding element to slide on the slide guiding structure with the sliding element; but when the connecting end of the display module moves from the second area to the first area, the connecting end disengages with the engaging portion of the sliding element to stride across the first area.

2. The portable computer as claimed in claim 1, wherein the sliding assembly further comprises a retaining structure movably engaging with the sliding element to suitably prevent the connecting element from disengaging with the engaging portion, and the retaining structure shifts relative to the sliding element to allow the connecting element to disengage with the sliding element when the sliding element approaches the first area from the second area.

3. The portable computer as claimed in claim 2, wherein the sliding assembly further comprises an elastic element disposed between the retaining structure and the sliding element and the elastic element allows the retaining structure to return to an original position after the retaining structure shifts relative to the sliding element.

4. The portable computer as claimed in claim 2, wherein the retaining structure comprises an operating portion, and the base further comprises a pressing portion disposed near a boundary between the first area and the second area, the pressing portion presses the operating portion when the sliding element approaches the first area from the second area, such that the retaining structure shifts relative to the sliding element.

5. The portable computer as claimed in claim 2, wherein the retaining structure further comprises a through portion for allowing the connecting element to pass through, and the retaining structure shifts relative to the sliding element to change a position of the through portion relative to the connecting element to be an open or a close state.

6. The portable computer as claimed in claim 1, wherein the engaging portion comprises an opening and a flange, and the connecting element comprises a protruded ring portion correspondingly; the connecting element enters or exits the engaging portion through the opening; the flange retains the protruded ring portion when the connecting element enters the engaging portion to prevent the connecting element from disengaging with the engaging portion from positions other than the opening.

7. The portable computer as claimed in claim 1, wherein the display module further comprises two auxiliary sliding elements disposed at two sides of the connecting end symmetrically; and the base further comprises two auxiliary sliding structure corresponding to the two auxiliary sliding element and are disposed at two sides of the first area symmetrically.

8. The portable computer as claimed in claim 7, wherein each auxiliary sliding element is a rolling magnetic element, and each auxiliary sliding structure is a sheet-like structure having a smooth surface and a magnetic attraction property.

9. The portable computer as claimed in claim 4, wherein the sliding element further comprises a positioning structure, and the base further comprises a corresponding positioning structure at the boundary between the first area and the second area; the corresponding positioning structure works with the positioning structure to position the sliding element.

10. The portable computer as claimed in claim 9, wherein the positioning structure comprises a first positioning portion and a second positioning portion; when the sliding element moves from the second area to the first area to fix the corresponding positioning structure at the first positioning portion, the sliding element is positioned at a first fixed position; when the sliding element keeps moving to fix the corresponding positioning structure at a second fixed position of the second positioning portion, the pressing portion presses the operating portion so that the retaining structure shifts relative to the sliding element to release the connecting element retained by the retaining structure.

11. The portable computer as claimed in claim 1, wherein the connecting element comprises a magnetic element for providing a magnetic attraction force to engage the engaging portion, such that the connecting element is held firmly at an engaging position.

12. The portable computer as claimed in claim 2, wherein the sliding element further comprises a limiting structure for limiting a shifting direction of the retaining structure.

13. The portable computer as claimed in claim 2, wherein a shifting direction of retaining structure is substantially perpendicular to a moving direction of the sliding element.

14. The portable computer as claimed in claim 2, wherein the retaining structure is pivotally connected to the sliding element to shift and rotate up and down relative to the sliding element.

15. The portable computer as claimed in claim 1, wherein the engaging portion is a C-shaped hook; and the connecting element is a rod element for hooking by the hook.

16. The portable computer as claimed in claim 1, wherein the engaging portion is a protruding structure, and the connecting element is a recess corresponding to the protruding structure.

17. The portable computer as claimed in claim 1, wherein the slide guiding structure is a rod element; and the sliding element is a sleeve element combining with the rod element to slide along the rod element.

18. The portable computer as claimed in claim 1, wherein the slide guiding structure comprises a sliding track, and the sliding element is a slider block disposed in the sliding track to slide along the sliding track.

19. The portable computer as claimed in claim 1, wherein the first area of the base further comprises an input module.

* * * * *